3,323,589
METHOD FOR DECREASING THE PERMEABILITY OF A SUBTERRANEAN STRATUM
Robert R. Harvey, Bartlesville, Okla., assignor to Phillips Petroleum Company, a corporation of Delaware
No Drawing. Filed Mar. 29, 1965, Ser. No. 443,674
14 Claims. (Cl. 166—9)

This invention relates to a method or process for reducing or decreasing the permeability of a subterranean stratum such as an oil-bearing stratum.

In the drilling of wells and during the production phase from crude oil-containing formations, including secondary recovery operations, it becomes desirable at times to seal off sections of the formation for various reasons or to reduce their permeability. In secondary recovery by liquid flooding, the predilection for the sweeping liquid to channel along more permeable sections of a stratum is particularly annoying since oil is not recovered from the by-pass section of the formation.

This invention is concerned with a novel and effective method for reducing the permeability of a permeable stratum to varying degrees and up to the complete plugging of the stratum in selected sections thereof.

Accordingly, it is an object of the invention to provide a novel method or process for decreasing the permeability of a subterranean stratum. Another object is to provide a method for sealing off or plugging a section of a permeable stratum. A further object is to provide a process for partially plugging (substantially reducing the permeability) the more permeable sections of a permeable oil-bearing stratum so as to reduce fingering. Another object of the invention is to provide a method of sealing off an oil-bearing stratum along a water or gas zone adjacent the stratum so as to prevent invasion of water or gas. Other objects of the invention will become apparent to one skilled in the art upon consideration of the accompanying disclosure.

A broad aspect of the invention comprises injecting into a selected area of an oil-bearing stratum an aqueous slug containing a non-ionic surfactant in solution therein and suspended 0.001 to 1 micron size particles of members of the group consisting of carbon black, talc, and kaolin, at selected concentrations of surfactant and suspended particles, and contacting the injected slug in the stratum with a salt solution so as to precipitate said particles therein and thereby reduce the permeability of the stratum in the selected area. The concentration of particles is regulated in the range of 0.05 to 2 weight per cent and the concentration of surfactant is controlled in the range of 0.001 to 5 weight percent. A preferred concentration of surfactant lies in the range of 0.01 to 1 weight percent and a preferred concentration of solid particles is in the range of 0.1 to 1 weight percent. In applications in which complete plugging or sealing off of a selected area of the stratum is desired, higher concentrations of solids and lower concentrations of surfactant are utilized. In applications in which the permeability is to be substantially reduced without plugging, lower concentrations of solids and higher concentrations of surfactant are used.

The mechanism by which the solid particles are precipitated or deposited when the injected slug contacts salt water is not completely understood. However, it has been demonstrated that the contacting of a non-ionic aqueous solution of surfactant containing suspended solids of the class described when contacted with a formation salt solution or brine having a concentration of salt in the range of about 1 to 10 weight percent results in rapid precipitation of the solid particles. It has been found that the lower the concentration of surfactant in the solution, the more readily the precipitation or deposition of solids from the carrier solution. In every instance sufficient surfactant is required to provide a good suspension and dispersion of the solid material in the aqueous solution.

The salt solution is preferably injected into the stratum thru an injection well or a production well penetrating the stratum prior to the injection of the aqueous suspension of solid particles. In some instances, however, it is feasible to inject the suspension of solid particles in the solution of surfactant to the desired area of the stratum and thereafter inject the salt water so as to effect the precipitation of the solid particles as the salt water mixes with the previously injected slug of surfactant.

In many applications, the salt solution comprises the connate water in the stratum. An illustration of this situation is found in the water coning around a production well wherein salt water from a subjacent water table forms a cone around the production well. In such a situation it is feasible to inject a slug of surfactant in aqueous solution containing the required concentration of suspended solids so as to precipitate the solids in a section of stratum adjacent the lower boundary of the oil-bearing stratum to form a barrier wall of impermeable stratum which greatly reduces or prevents the encroachment of salt water into the producing area around the well.

The same technique applies to the prevention of encroachment of gas into the producing zone around the well. In this situation, a salt water solution is injected into the stratum adjacent the gas zone and the slug containing the suspended solid particles is then injected into the stratum and driven to the injected salt water so as to effect the desired precipitation and plugging.

It is feasible to pack off the well within the oil-bearing stratum so as to inject the salt water at the level desired.

The invention is predicated upon the discovery that when injecting finely divided hydrophobic particles of the class described as surfactant carriers into a stratum the particles tend to settle out as the solution carrying the particles moves deeper into the stratum from the injection well because the carriers give up the surfactant to the interstitial surfaces upon which they are absorbed. The particles tend to settle out, nearly irreversibly, in the pore structure. Generally the concentration and distribution of these particles in the pore structure is too small to materially affect the permeability of the stratum. However, the precipitation or deposition of the solid particles is greatly accelerated when the solution is contacted with brine, causing immediate fluocculation and either sealing of the formation or substantially reducing the permeability thereof, depending upon the conditions which obtain in the area of the stratum in which the contacting of the brine and the suspension of particles takes place. The concentration of surfactant may be regulated so that it will dissipate faster and cause the solid particles to be deposited at a specific penetration depth of the stratum from the injection well as determined by core tests.

The plugging action depends upon several factors such as:

(1) Suspending power of the surfactant,
(2) Nature of the hydrophobic material,
(3) Presence of electrolytes,
(4) Presence of dispersing agents,
(5) Presence of other surfactants.

A number of non-ionic surface active agents or surfactants which are water soluble are readily available from commercial sources. Hydrophilic (or lyophylic) agents attracted to the water phase are most desirably employed. Exemplary non-ionic agents are those obtained by reaction of a hydrophobic hydroxy compound such as a phenol or alcohol with several moles of an alkylene oxide principally ethylene oxide or propylene oxide. Water solubility increases with the number of moles of the alkylene oxide reacted. Such reaction products from oleyl alcohol, alkylated-B-naphthol, alkyl phenol such as nonylphenol, may be mentioned as exemplary. Similarly alkylene oxide (ethylene oxide) reaction products of higher fatty acids are well known as well as of fatty acid esters, including ethylene oxide reaction products of fatty acid esters, including ethylene oxide reaction products of fatty acid esters of anhydrosorbitols. Lauric, palmitic, oleic, and stearic acids are commonly used for such esters which may generally be referred to as polyoxyalkylene derivatives of hexitol anhydride partial long chain fatty acid esters. The hexitol is usually sorbitol. Other non-ionic agents include phosphoric acid esters of polyethylene glycol; low order condensation products of alkylene oxides with esters of polyhydric alcohols and polybasic soluble acids, such as glycol tartrate and glycerol stearate further esterified with stearic acid; alkylene oxide condensation products of higher fatty acid reaction products with alkylolamines such as coconut fatty acids with diethanolamine; saponins; etc.

Not all non-ionic surfactants are equivalents in the process of the invention. It has been found that a number of non-ionic surfactants are considerably superior to others which have been carefully screened. These most effective compounds represent a common class of surfactants within special limitations as follows:

(1) They are all non-ionic polyethylene oxide ethers or thioethers.

(2) The average ethylene oxide chain length at the hydrophilic end is in the range of about 3 to 100 moles, with a single terminal hydroxyl group.

(3) The effectiveness of the surfactant in this particular application depends upon the length of the ethylene oxide chain as well as the overall length of the molecule.

(4) The hydrophobic (oleophilic) portion of the molecule may be either straight chain or branched hydrocarbons which may also be linked to the ethylene oxide portion through a phenolic ring, including the octyl and nonylphenols.

Certain polyethylene oxide ethers and thioethers listed below are commercially available and are especially effective in the process of the invention:

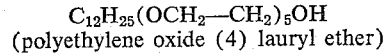
(polyethylene oxide (4) lauryl ether)

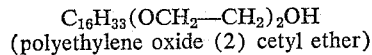
(polyethylene oxide (2) cetyl ether)

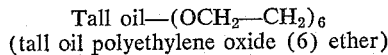
(tall oil polyethylene oxide (6) ether)

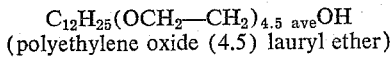
(polyethylene oxide (4.5) lauryl ether)

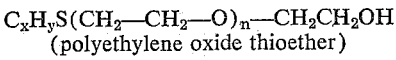
(polyethylene oxide thioether)

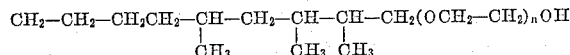
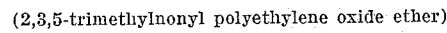
(2,3,5-trimethylnonyl polyethylene oxide ether)

The effectiveness of the invention was demonstrated utilizing a 0.06 weight percent solution of surfactant (Igepal CO 530) containing a 0.1 weight percent suspension of Philblack E (carbon black). A Burbank sand core was prepared by casting a section of core 1¼″ in diameter in epoxy resin and the casting was sawed with a diamond saw into ⅛″ discs having a center sand core section 1¼″ in diameter and an annular epoxy resin section surrounding the core. The disc was positioned in a standard millipore filter apparatus attached to a vacuum funnel and the disc was sealed between the filter and a graduated cylinder open to the sand core of the disc so that liquid introduced to the graduated cylinder could be passed through the sand core and the millipore filter into the vacuum flask. A brine solution containing 5 weight percent of sodium chloride was passed through the sand core to saturate the sand with brine and the solution of Igepal CO 530 containing suspended carbon black was introduced to the graduated cylinder above the saturated sand core until the solution was at the 100 cc. level. The vacuum was applied to the subjacent flask to cause solution to flow. Plugging occurred after 25 cc. of solution passed through the disc. The disc was considered plugged when the vacuum applied to the flask no longer induced flow of liquid through the core.

In a similar test utilizing Igepal CO 990 at the same concentrations of surfactant and carbon black, plugging occurred after about 50 cc. of the solution passed through the sand core.

These tests demonstrate the plugging effect obtained with such solutions in sand such as found in an oil reservoir when the solution contacts brine. The tests also demonstrate that the rate of plugging or rate of deposition of carbon can be controlled by the character of the surfactant.

The Igepal and similar type surfactants differ in the number of ethoxy groups in the molecule. They are nonylphenoxy polyethanols, the CO 530 species having approximately 6 ethoxy groups while the CO 990 species has approximately 100 ethoxy groups per molecule.

The other species, talc and non-swelling kaolin in the required particle size range of 0.001 to 1 micron, are also effective in plugging and reducing permeability to various selected degrees.

When decreasing fingering in an oil-bearing stratum of variable permeability, the concentration of particles is controlled within the range of 0.05 to 0.15 weight percent and the concentration of surfactant is controlled in the range of 0.001 to 0.1 weight percent. The largest concentration of the injected solution of surfactant containing the suspended solid particles is found in the more permeable areas or sections of the stratum so that the contacting of this higher concentration of solids in these areas with the salt solution deposits a greater amount of solids than in the less permeable areas or sections of the stratum, thereby decreasing the amount of variation in the permeability of the stratum. This has the effect of decreasing fingering when producing the oil-bearing stratum by fluid drive such as by water flooding or with oil miscible liquids. The surfactant can be chosen so as to control particle deposition and permeability. Igepal CO 990 is more desirable than Igepal CO 530 in application to a stratum in reducing fingering.

The size of the slug of surfactant to be injected depends upon the particular application or problem which is to be overcome. Amounts in the range of 0.001 to 1 pore volumes cover the usable range. The amount of salt water to be injected will vary within approximately the same range and the particular amount to be used depends upon the application or problem to be solved, in the same manner.

Certain modifications of the invention will become apparent to those skilled in the art and the illustrative details disclosed are not to be construed as imposing unnecessary limitations on the invention.

I claim:

1. A process for reducing the permeability of a subterranean stratum which comprises the steps of:
   (1) injecting into a selected area of said stratum an aqueous slug containing a non-ionic surfactant in solution therein and suspended 0.001 to 1 micron size particles of the group consisting of carbon black, talc, and kaolin, the concentration of said particles being in the range of 0.05 to 2 weight percent and the concentration of surfactant being in the range of 0.001 to 5 weight percent; and
   (2) contacting the injected slug of step (1) in said stratum with a salt solution so as to precipitate said particles in said stratum and reduce the permeability thereof in said selected area.

2. The process of claim 1 wherein the salt solution of step (2) is injected into the selected area prior to step (1).

3. The process of claim 1 wherein the salt solution of step (2) is connate water in place in said stratum.

4. The process of claim 1 wherein the amount of said slug is in the range of 0.05 to 1.0 pore volumes.

5. The process of claim 1 wherein said particles are carbon black.

6. The process of claim 1 wherein said particles are talc.

7. The process of claim 1 wherein said particles are kaolin.

8. The process of claim 1 wherein said surfactant is a member of the group consisting of the polyethylene oxide ethers and thioethers having an average ethylene oxide chain length at the hydrophilic end in the range of about 3 to 100 moles.

9. A process for decreasing fingering of injected fluids in a fluid drive process in an oil-bearing stratum of variable permeability penetrated by an injection well and a production well, which comprises the steps of:
   (1) injecting into said stratum through said injection well toward said production well an aqueous slug of non-ionic surfactant solution containing a suspension of 0.001 to 1 micron size particles selected from the group consisting of carbon black, talc, and kaolin, the concentration of said particles being in the range of 0.05 to 0.15 weight percent and the concentration of surfactant being in the range of 0.001 to 0.1 weight percent, the concentration of said slug and said particles being greater in the more permeable areas than in the less permeable areas of said stratum; and
   (2) contacting the injected slug of step (1) in said stratum with salt water so as to effect precipitation of said particles and reduce the permeability of said more permeable areas substantially more than of said less permeable areas.

10. The process of claim 9 wherein said surfactant is a member of the group consisting of the polyethylene oxide ethers and thioethers having an average ethylene oxide chain length at the hydrophilic end in the range of about 3 to 100 moles.

11. A process for plugging off a salt water zone adjacent an oil-bearing stratum from which salt water tends to invade said stratum around a production well therein which comprises the steps of:
   (1) injecting through said well into the area of said stratum adjacent said salt water zone an aqueous slug of non-ionic surfactant solution containing a suspension of 0.001 to 1 micron size particles selected from the group consisting of carbon black, talc, and kaolin, the concentration of said particles being in the range of 0.05 to 2 weight percent and the concentration of said surfactant being in the range of 0.001 to 0.1 weight percent; and
   (2) driving said slug into contact with said salt water so as to rapidly precipitate solids within the pores of said stratum along the boundary of said salt water zone to seal off same.

12. The process of claim 11 wherein said surfactant is a member of the group consisting of the polyethylene oxide ethers and thioethers having an average ethylene oxide chain length at the hydrophilic end in the range of about 3 to 100 moles.

13. A process for plugging off a gas zone adjacent an oil-bearing stratum from which gas tends to invade said stratum around a production well therein which comprises the steps of:
   (1) injecting through said well into the area of said stratum adjacent said gas zone a slug of salt water;
   (2) following step (1), injecting through said well into said stratum an aqueous slug of non-ionic surfactant solution containing a suspension of 0.001 to 1 micron size particles selected from the group consisting of carbon black, talc, and kaolin, the concentration of said particles being in the range of 0.05 to 2 weight percent and the concentration of said surfactant being in the range of 0.001 to 0.1 weight percent; and
   (3) driving the slug of step (2) into contact with the salt water of step (1) so as to effect rapid precipitation of said particles within the pores of said stratum adjacent the boundary of said gas zone and seal off same.

14. The process of claim 13 wherein said surfactant is a member of the group consisting of the polyethylene oxide ethers and thioethers having an average ethylene oxide chain length at the hydrophilic end in the range of about 3 to 100 moles.

References Cited
UNITED STATES PATENTS

| | | | |
|---|---|---|---|
| 2,241,255 | 5/1941 | Garrison | 175—72 X |
| 2,258,000 | 10/1941 | Chamberlain | 166—30 |
| 2,272,672 | 2/1942 | Kennedy | 166—10 |
| 2,272,673 | 2/1942 | Kennedy | 166—10 |
| 2,776,010 | 1/1957 | Rike | 166—30 X |
| 2,800,963 | 7/1957 | Roberts et al. | 166—29 X |
| 2,965,172 | 12/1960 | Da Roza | 166—42 |
| 3,046,222 | 7/1962 | Phansalkar et al. | 252—8.55 |
| 3,180,414 | 4/1965 | Parker | 166—29 |

CHARLES E. O'CONNELL, *Primary Examiner.*

I. A. CALVERT, *Assistant Examiner.*